United States Patent [19]
Snyder et al.

[11] Patent Number: 5,876,590
[45] Date of Patent: Mar. 2, 1999

[54] ELECTROCHEMICAL LEACHING OF SOIL

[75] Inventors: Thomas S. Snyder, Oakridge, Tenn.; Dale L. Keairns, Pittsburgh, Pa.

[73] Assignee: The Scientific Ecology Group Inc., Columbia, Md.

[21] Appl. No.: 772,475

[22] Filed: Dec. 23, 1996

[51] Int. Cl.$^6$ ................................................ B01D 61/44
[52] U.S. Cl. .................. 205/703; 205/746; 205/747; 205/748; 205/749; 205/770; 204/263; 204/264; 204/275; 204/276
[58] Field of Search ..................... 205/703, 746, 205/747, 748, 749, 770; 204/263, 264, 275, 276

[56] References Cited

U.S. PATENT DOCUMENTS

| | | | |
|---|---|---|---|
| 4,324,629 | 4/1982 | Oka et al. | 204/DIG. 13 |
| 5,156,722 | 10/1992 | Snyder et al. | 204/112 |
| 5,183,541 | 2/1993 | Snyder et al. | 204/105 R |
| 5,217,585 | 6/1993 | Snyder et al. | 204/112 |
| 5,242,503 | 9/1993 | Grant et al. | 134/25.1 |
| 5,262,019 | 11/1993 | Snyder et al. | 204/105 R |
| 5,266,494 | 11/1993 | Lahoda et al. | 436/57 |
| 5,342,449 | 8/1994 | Holbein et al. | 134/2 |
| 5,419,821 | 5/1995 | Vaughan | 204/DIG. 13 |
| 5,434,332 | 7/1995 | Cash | 588/1 |
| 5,436,384 | 7/1995 | Grant et al. | 588/1 |
| 5,439,562 | 8/1995 | Snyder et al. | 204/1.5 |

OTHER PUBLICATIONS

Miscellaneous Resintech™ Inc. Technical Literature, publishing date unknown.

Turner, A.D. and Neville "Electrical Membrane Processes in Effluent Treatment", AEA Technology publication, 1993.

Turner, A.D. and Neville, "Direct Membrane Cleaning Technology", AEA Technology publication.

*Primary Examiner*—Arun S. Phasge
*Attorney, Agent, or Firm*—Frommer Lawrence & Haug LLP

[57] ABSTRACT

An electrochemical leaching system for cleaning contaminated fines. The system has a waste vessel for receiving and holding a contaminated fines and lixiviant mixture. On a side of the waste vessel is an anolyte vessel holding an anolyte fluid. An anolyte barrier separates the waste and anolyte vessels. On an opposite side of the waste vessel is a catholyte vessel holding a catholyte fluid. A catholyte barrier separates the waste and catholyte vessels. A potential between an anode in the anolyte vessel and a cathode in the catholyte vessel ionizes the fines contaminants into anionic and cationic contaminants in the lixiviant. The anolyte and catholyte barriers allow the anionic and cationic contaminants, respectively, to flow from the lixiviant and into the anolyte and catholyte fluids in their respective vessels without allowing bulk transfer therebetween. The anionic and cationic contaminants are then removed from the anolyte and catholyte fluids. A cleaner lixiviant and fines exits the system.

25 Claims, 5 Drawing Sheets

ELECTROCHEMICAL LEACHING OF SOIL

FIELD OF THE INVENTION

This invention relates generally to the field of decontamination of soil with metallic and other contaminants. More specifically, this invention relates to a system and method for the electrochemically leaching of the contaminants.

BACKGROUND OF THE INVENTION

For the purposes of the present application the following word(s) and expression(s), unless otherwise indicated, shall be understood as having the meaning indicated in respect thereto:

the word "soil" and the like (whether as noun, adjective, etc.) shall be understood as referring to unconsolidated mantle (whether natural or man made) including:
  material disposed on dry land masses;
    sediment including any bottom sediments of fresh or marine water systems;
  material which is wholly mineral or which in addition to mineral material, has an organic matter portion derived for example from plant or animal sources; organic material such as plant material would usually form part of the courser aggregate material as described hereinafter and would include, for example, tree stumps, ligneous particles, floor sweepings, etc.;
    man-made mineral aggregate material and fill materials as well as man-made sediments arising in waterways; and
    mineral residues from mining operations, such as those present in a tailings pond;

the words "fine" or "fines" shall be understood as referring to particles of soil having a diameter of not greater than approximately 250 $\mu$;

the word "aggregate" and any similar word (whether as noun, adjective, etc.) shall be understood as referring to or as characterizing (or emphasizing) a "soil", "sediment", "material" or any portion thereof as a mass of individual particles or components of the same or varied size (e.g. the size of the components may be not uniform and may range from microscopic granules to 10 cm and larger); it is also to be understood that the particle size distribution of any particular soil mass, etc. may be different from that of another soil mass, etc.;

the words/expressions "contaminated", "metal contaminated" and the like, when used in relation to the words "soil", "sediment", "material" and the like, shall be understood as referring to that portion of the unconsolidated mantle (whether natural or man made) which is contaminated, in any way whatsoever, whether voluntarily or otherwise;

the word "lixiviant" shall be understood as referring to a reagent capable of extracting a soluble constituent (i.e. solubilizing) from a solid mass (i.e. the lixiviation of a material);

the words "decontaminate", "decontamination" and the like shall, in relation to metal contaminated material, be understood as referring to a process or the material produced by a process wherein the material or part thereof is provided which has a reduced level of metal as compared to the original material; and the word "classification" and the like shall, be understood as referring to the dividing of an aggregate material into size groupings or portions and as including separation of constituent components in accordance with size, separation of constituent components by magnetic separation, disaggregation to reduce particle size followed (as desired or necessary) by magnetic separation and/or separation by size (e.g. size separation by screening, gravity separation, etc.).

Metal contaminants in aggregate consist of naturally occurring metals as well as man-made metals. The metal contaminants may be present as free or chemically combined species in any state of oxidation chemically possible. Metal contaminants include, for example, base metals, such as lead, zinc, mercury, cadmium, copper, nickel, chromium and cobalt, as well as other metals such as silver, molybdenum, selenium, arsenic and vanadium, etc. Metal contaminants also include radioactive metals (such as for example uranium, technetium, radioactive cobalt60, and plutonium) and other inorganic species (such as for example metal complexes based on arsenates, selenates, etc.) which when present in a soil are considered to be a contaminant.

The existence of metal contaminated aggregate material can lead to serious environmental problems. Improperly contained or decontaminated aggregate material can, for example, contribute to unsafe levels of metal(s) in surface and ground water as well as in the air (e.g. by contaminated dust). Contaminated aggregate material can thus affect the health and well being of people living or working in the vicinity of or who come into direct contact with such material.

Thus, the presence of contaminated aggregate on the sites of former or existing industrial complexes, for example, pose a particularly serious problem. Since such aggregate can pose a risk to the health of individuals, the presence of such soils can seriously affect the continued or alternate usage of such sites, e.g. redevelopment of a former industrial site for residential use may be precluded due to the presence of the contaminated soil.

Discarded mining aggregate is another source of contaminated aggregate. Previous mining operations were limited by the current technology of the time as to the amount of metals that could be extracted. As a result, discarded mining aggregate exists that could be further processed to extract more of the metal. However, the existence of the aggregate creates an environmental concern.

The related art discloses decontaminating aggregate by the use of physical mechanisms, i.e., segregation by classification; chemical mechanisms, i.e., accelerated chemical leaching; or a combination of both. The use of any of these mechanisms results in a clean fraction and a fines fraction. The fines fraction consists of small particles that are relatively highly contaminated per unit volume. This is due to the fines having a higher surface area per unit volume, relative to larger particles. The higher surface per unit volume offers more exchange and adsorption sites for the contaminants to bind to the soil. As a result, the fines fraction is also highly resistant to washing as the fines have already resisted previous soil washings.

As the fines fraction can reach 10% to 20% of the soil, treatment and disposal of it is a critical issue in soil decontamination. Therefore, a need exists to decontaminate the fines that result from the decontamination of aggregate material.

SUMMARY OF THE INVENTION

An electrochemical leaching system for cleaning contaminated soil comprises a waste vessel for receiving and holding a contaminated soil and lixiviant mixture. On a side of the waste vessel is an anolyte vessel holding an anolyte fluid. An anolyte barrier separates the waste and anolyte vessels. On an opposite side of the waste vessel is a catholyte vessel holding a catholyte fluid. A catholyte barrier separates the waste and catholyte vessels. A potential between an anode in the anolyte vessel and a cathode in the catholyte vessel ionizes the soil contaminants into anionic and cationic contaminants in the lixiviant. The anolyte and catholyte barriers allow the anionic and cationic contaminants, respectively, to flow from the lixiviant and into the anolyte and catholyte fluids in their respective vessels without allowing bulk transfer therebetween. The anionic and cationic contaminants are then removed from the anolyte and catholyte fluids. A cleaner lixiviant and soil exits the system.

DETAILED DESCRIPTION OF THE PREFERRED EMBODIMENT(S)

Figure 1:
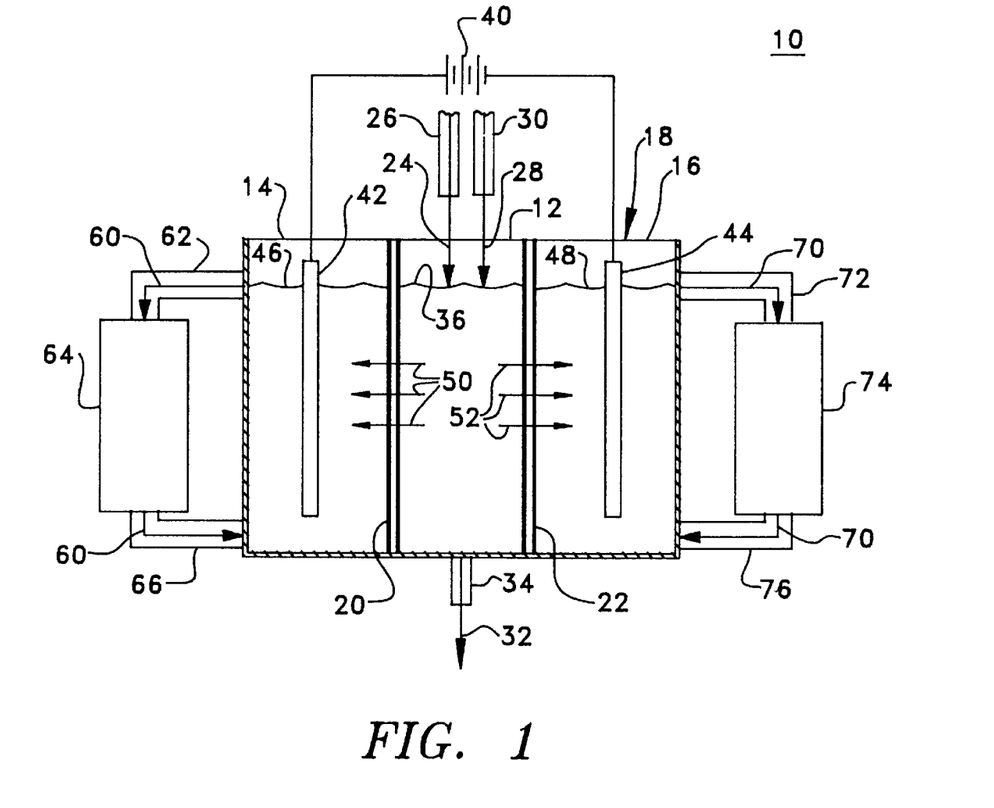
FIG. 1 is a schematic view of an electrochemical leaching system for decontaminating fines.

Referring now to the drawings, wherein like reference numerals designate corresponding structures throughout the views, and referring in particular to FIG. 1, an electrochemical leaching system 10 is comprised of a waste vessel 12 that is located between an anolyte vessel 14 and a catholyte vessel 16. The anolyte vessel 14 and the waste vessel 12 are separated by an anolyte barrier 20. Likewise, the catholyte vessel 16 and the waste vessel 12 are separated by a catholyte barrier 22. In the preferred embodiment, waste vessel 12, anolyte vessel 14, and catholyte vessel 16 are formed by inserting the anolyte barrier 20 and the catholyte barrier 22 into a unitary vessel 18. By doing so, the unitary vessel 18 is separated into the three sections, thus forming the vessels. In other embodiments of the invention, the vessels 12, 14, and 16 may be separate and not formed from a unitary vessel.

Electrochemical leaching system 10 processes fines 24 comprising contaminants being ionizable to anionic contaminants and cationic contaminants. Fines 24 enters the waste vessel 12 through a fines feed 26. Also entering the waste vessel 12 is a lixiviant 28 via a lixiviant feed 30. These two items mix in the waste vessel 12 to form a fines and lixiviant mixture 36. The system 10 ionizes the contaminants into anionic and cationic contaminants which are then dispersed in the mixture 36. The system 10 then removes the anionic and cationic contaminants from the mixture 36. The mixture 36 exits the waste vessel through exit 34 as effluent 32.

The present invention removes the contaminants from the fines 24 through an electrochemical leaching process. This is accomplished by applying an electrical potential across the waste vessel 12, or more particularly, across the fines and lixiviant mixture 36 within waste vessel 12. The electrical potential is generated by a power source 40 applying an electrical potential between an anode 42 and a cathode 44. The anode 42 is located in an anolyte fluid 46 that is held in the anolyte vessel 14. The anolyte fluid 46 is comprised of a suitable base solution. The cathode 44 is located in a catholyte fluid 48 that is held in the catholyte vessel 16. The catholyte fluid 48 is comprised of a suitable acid solution.

The anolyte fluid 46 is separated from the fines and lixiviant mixture 36 by the anolyte barrier 20. Similarly, catholyte fluid 48 is separated from fines and lixiviant 36 by the catholyte barrier 22. When the power source 40 develops a potential across the mixture 36, ionizable contaminates are liberated from the fines 24 and are dispersed in the mixture 36 in the form of anionic contaminates and cationic contaminants. As the anionic and cationic contaminants possess an electrical charge, they are attracted to their respective anode 42 or cathode 44. The anolyte barrier 20 is designed to allow the anionic contaminates to move into the anolyte vessel 14 in the form of an anionic contaminant flow 50 through the barrier. This results in the anionic contaminants entering the anolyte fluid 46. Similarly, the cationic contaminants form a cationic contaminant 52 flow through the catholyte barrier 22 and into catholyte vessel 16. The barriers 20 and 22 are semi-permeable, meaning that they are designed to inhibit the bulk transfer of fluids and fines 24 between the vessels.

To remove the anionic contaminants from the anolyte fluid 46, an anolyte fluid stream 60 is removed from the anolyte vessel 14 via anolyte vessel exit means 62. The anolyte vessel exit means 62 can comprise a simple pipe line, a pumping system controlled by a programmable controller (not shown) or any other suitable means. The anolyte fluid stream 60 is delivered to an anolyte processing means 64 which removes the anionic contaminants from anolyte fluid stream 60. Embodiments of anolyte processing means 64 are discussed below. The anolyte fluid stream 60 exits from anolyte processing means 64 via an anolyte fluid return means 66 and is delivered back to the anolyte vessel 14. As with the anolyte fluid exit means 62, anolyte fluid return means 66 can be a simple pipe, a pumping system controlled by a programmable controller or any other suitable means.

To remove the cationic contaminants from the catholyte fluid 48, a catholyte fluid stream 70 is removed from the catholyte vessel 16 via a catholyte vessel exit means 72. The catholyte vessel exit means 72 can comprise a simple pipe line, a pumping system controlled by a programmable controller (not shown) or any other suitable means. The catholyte fluid stream 70 is delivered to catholyte processing means 74. The catholyte processing means 74 removes the anionic contaminants from the catholyte fluid stream 70. Embodiments of catholyte processing means 74 are discussed below. The catholyte fluid stream 70 is removed from the catholyte processing means 74 via catholyte fluid return means 76 and delivered into the catholyte vessel 16. As with the catholyte vessel exit means 72, the catholyte fluid return means 76 can be a simple pipe, a pumping system controlled by a programmable controller or any other suitable means.

Figure 2:
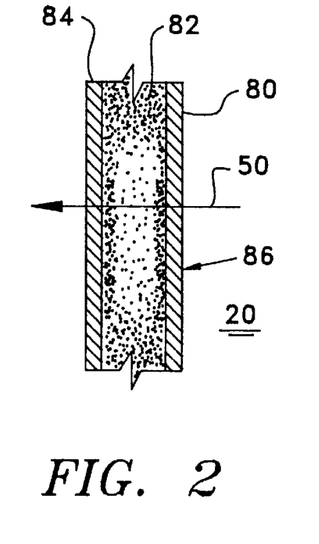
FIGS. 2 and 3 are detail views of semipermeable-permeable membranes used to separate different vessels of the electrochemical leaching system.

Now referring to FIG. 2, the anolyte barrier 20 is comprised of three components. The first component is a semi-permeable first membrane 80. The second component is a semi-permeable second membrane 84. In other embodiments of the invention, bounding fabrics that allow restricted fluid flow are used in place of the membranes 80 and 84. The first membrane 80 and the second membrane 84 are aligned in a parallel fashion. Disposed between the first membrane 80 and the second membrane 84 is a weak-base, powered resin anion exchanger 82. This arrangement forms a membrane/anionic exchanger/membrane barrier 86. The membrane/anionic exchanger/membrane 86 operates by the anionic contaminants flowing through first membrane 80 in the direction of the anionic contaminant flow 50. The anionic contaminants are adsorbed to the anion exchanger 82 and migrate therethrough in the direction of flow 50. Then, the anionic contaminants migrate through the second membrane 84 and into the anolyte fluid 46. Other embodiments of the invention use an ion exchange membrane which is commercially offered by Resintech, Inc., 615 Deer Road, Cherry Hill, N.J. 08034 as AMI-4 strong base anion membranes. Other embodiments of the invention may use other suitable ion exchange membranes.

Figure 3:
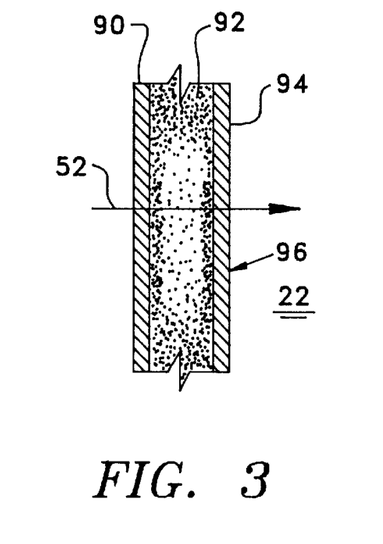

Now referring to FIG. 3, the catholyte barrier 22 is comprised of three components. The first component is a semi-permeable first membrane 90. The second component is a semi-permeable second membrane 94. In other embodiments of the invention, bounding fabrics that allow restricted fluid flow are used in place of the membranes 90 and 94. First membrane 90 and second membrane 94 are aligned in a parallel fashion. Disposed between the first membrane 90 and the second membrane 94 is a weak-acid, powered resin cation exchanger 92. This arrangement forms a membrane/cationic exchanger/membrane barrier 96. The membrane/cationic exchanger/membrane 96 operates by the cationic contaminants flowing through first membrane 90 in the direction of the cationic contaminant flow 52. The cationic contaminants are adsorbed to the cation exchanger 82 and migrate therethrough in the direction of flow 52. Then, the cationic contaminants migrate through the second membrane 94 and into the catholyte fluid 48. Other embodiments of the invention use ion exchange membranes which are commercially offered by Resintech, Inc., 615 Deer Road, Cherry Hill, N.J. 08034 as CMI-4 and CMI-7 strong acid cation membranes. Other embodiments of the invention may use other suitable ion exchange membranes.

Figure 4:
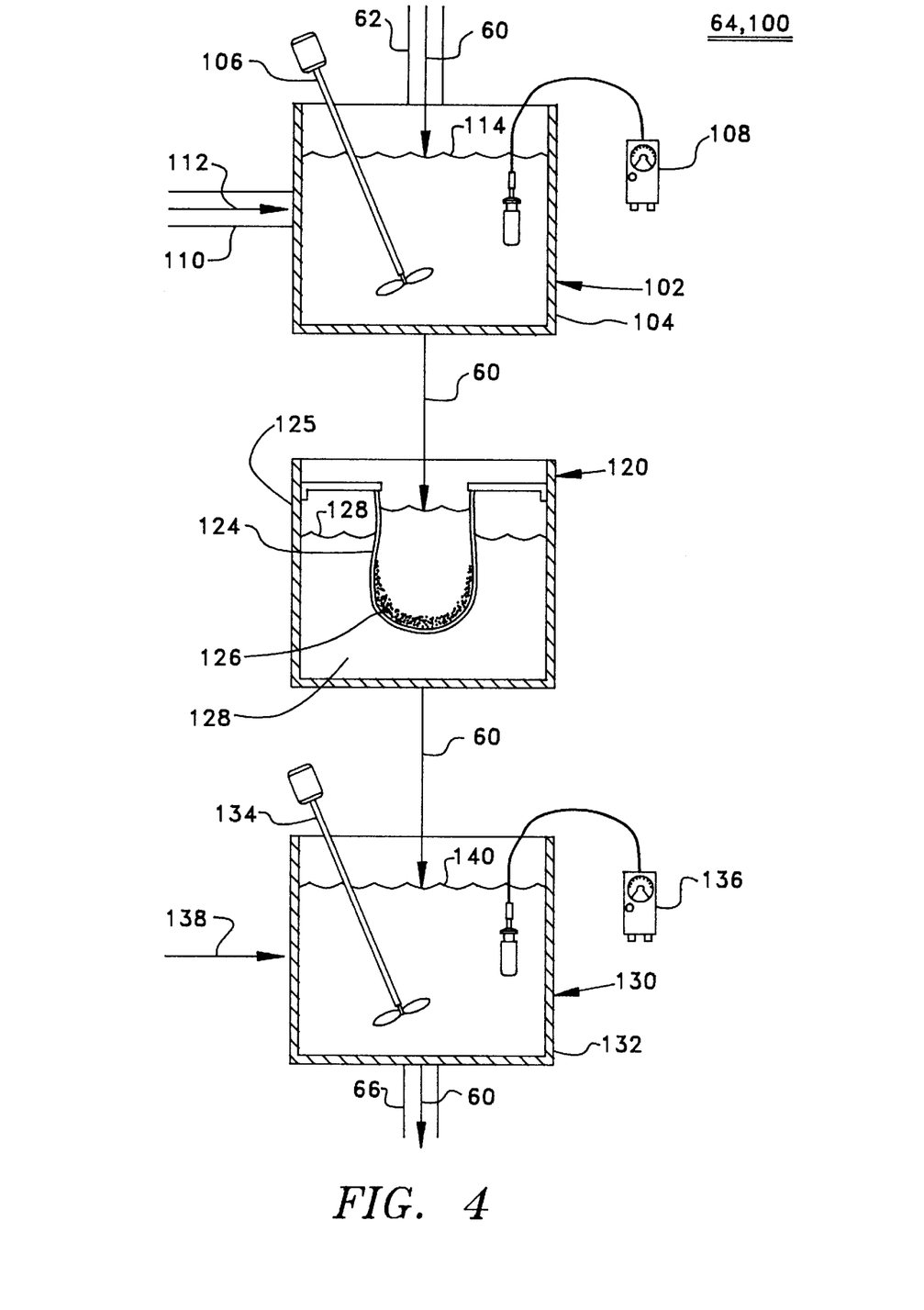
FIG. 4 is a schematic view of an ammonium filtering process used in an anolyte processing means of the invention.

Now referring to FIG. 4, an embodiment of the anolyte processing means 64 is an ammonium filtering process 100. The anolyte fluid exit means 62 removes the anolyte fluid stream 60 from anolyte vessel 14 and delivers it into anolyte pH adjustment means 102. The anolyte pH adjustment means 102 is comprised of an agitator 106 and a pH meter 108 disposed in a pH adjustment vessel 104. The anolyte fluid stream 60 is delivered to an anolyte fluid 114 in the pH adjustment vessel 104, where it is agitated by agitator 106 and its pH is measured by the pH meter 108. An $NH_3$ sparge 110 introduces $NH_3$ 112 into anolyte fluid 114. The introduction of the $NH_3$ 112 can either be controlled by a programmable controller connected to pH meter 108, performed manually, or any other suitable means. The $NH_3$ 112 reacts with the anionic contaminants to form ammonium compounds. The $NH_3$ 112 is sparged into the anolyte fluid 114 until it reaches a suitable pH to form the ammonium compounds, which is dependent upon the composition and properties of the anolyte fluid 114. In other embodiments of the invention, the anolyte pH adjustment means 102 can be any suitable means to introduce the $NH_3$ 112 into the anolyte fluid 114, including an in-line pH adjustment apparatus (not shown). Additionally, $NH_4OH$ can be substituted for $NH_3$ 112.

The anolyte fluid stream 60 with ammonium compounds flows from the anolyte pH adjustment means 102 into filter means 120, where the ammonium compounds are filtered out. The filter means 120 is a bag filter system consisting of a bag filter 124 suspended in a housing 125. The anolyte fluid stream 60 with ammonium compounds enters the filter means 120 and flows through from the inside to the outside of the bag filter 124. As it flows through the bag filter 124, ammonium compounds deposits 126 are formed from the ammonium compounds being deposited on the inside of the bag filter. Other embodiments of the invention include any other suitable filtering media, including other bag filter arrangements, filter plates, filter beds, and filter cartridges. After passing through the bag filter 124, the anolyte fluid 60 collects in an anolyte fluid 128 in the housing 125.

The anolyte fluid stream 60 is withdrawn from anolyte fluid 128 and delivered to an anolyte pH adjustment means 130. The anolyte pH adjustment means 130 is comprised of an agitator 134 and a pH meter 136 disposed in a pH adjustment vessel 132. The anolyte fluid stream 60 is delivered to an anolyte fluid 140 in the pH adjustment vessel 132, where it is agitated by agitator 134 and its pH measured by the pH meter 136. The anolyte pH adjustment means 130 lowers the pH of the anolyte fluid 140 to approximately 6–8 pH. This is accomplished by adding concentrated acid 138 to the anolyte fluid 140. The strength and type of acid is a function of the specific circumstances. As with the anolyte pH adjustment means 102, the anolyte pH adjustment means 130 can be any suitable method for lowering the pH of anolyte fluid 140, including an in-line pH adjustment device. Although not represented in FIG. 4, it should be understood that any required piping, pumping, and control means necessary to move anolyte fluid stream 60 through the different stages of ammonium filtering process 100 is included in the invention. The anolyte fluid stream 60 is removed from the pH adjustment vessel 132 and returned to the anolyte vessel 62 via an anolyte return means 66.

Figure 5:
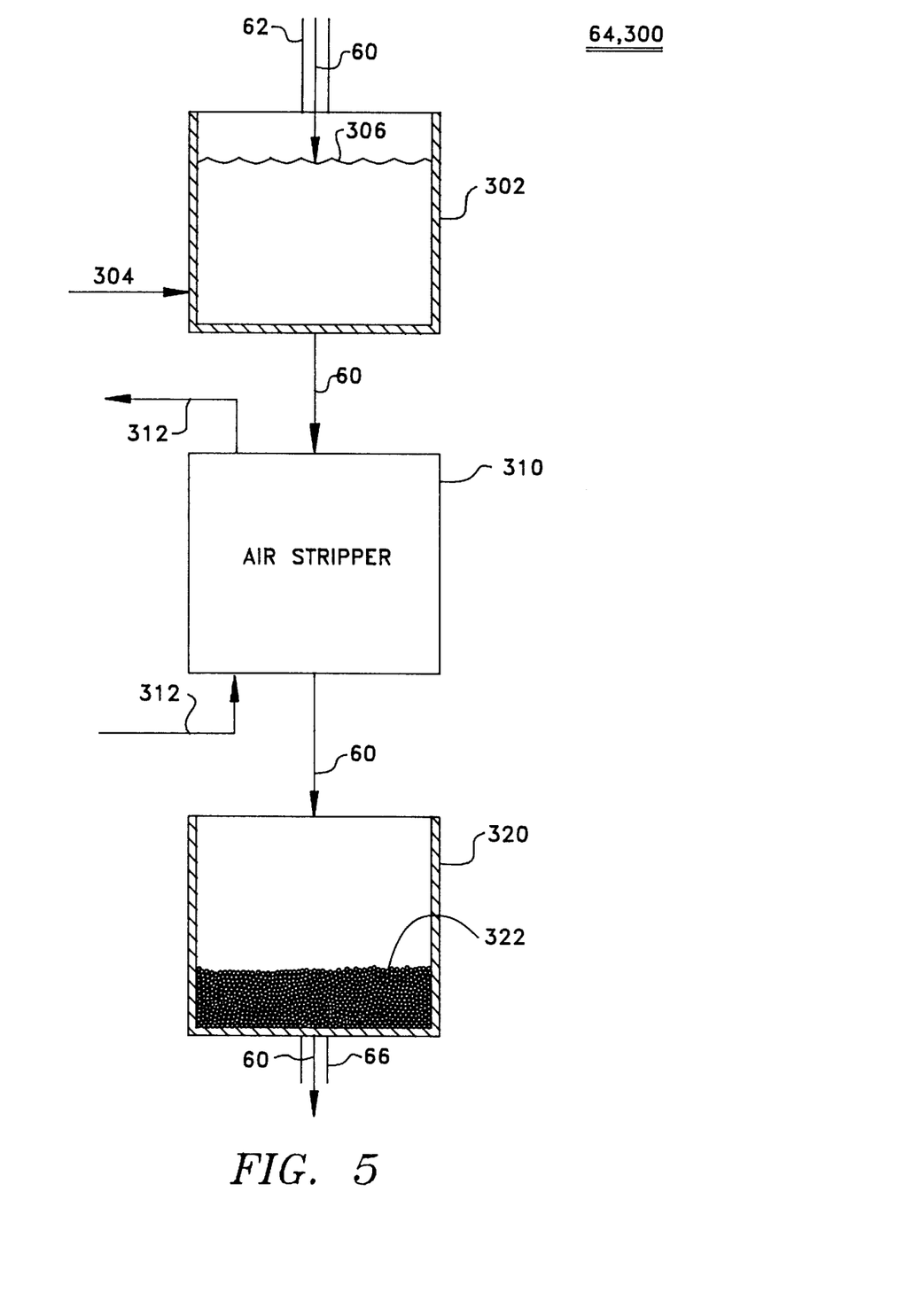
FIG. 5 is a schematic view of an uranium/technetium removal process used in an anolyte processing means of the invention.

Now referring to FIG. 5, an embodiment of the anolyte processing means 64 is an uranium/technetium removal process 300. Removal process 300 comprises receiving anolyte fluid stream 60 into the anolyte fluid 306 in an oxidizer 302 from anolyte vessel exit means 62. An oxidizing agent 304 is delivered into the anolyte fluid 306 such that the concentration of the oxidizing agent in the fluid in less than approximately 20 ppm. The oxidizing agent 304 can be $O_3$ or $H_2O_2$. An ultra-violet/$H_2O_2$ process is used to oxidize the anolyte fluid 306 in an alternative embodiment of the invention. Stream 60 then flows from oxidizer 302 to air stripper 310 where air 312 is purged through the stream. The stream 60 then flows into resin bed 320 to remove the uranium. The resin bed contain resin 322 which is a strong-base anion exchanger. Stream 60 then flows back to the anolyte vessel via anolyte fluid return means 66.

In an alternative embodiment for treating fines that do not contain technetium, the oxidizer 302 and the air stripper 310 are not used and the resin 322 is a resin commercially offered by Dow Chemical Co., 2040 Dow Center, Midland, Mich. 48674 as Dowex 50. Other embodiments of the invention use other suitable resins 322 for treating fines with technetium. In another alternative embodiment for treating fines contaminated only with uranium, the anolyte fluid 46 is an $H_2SO_4$ solution at approximately a pH of 4.5.

Figure 6:
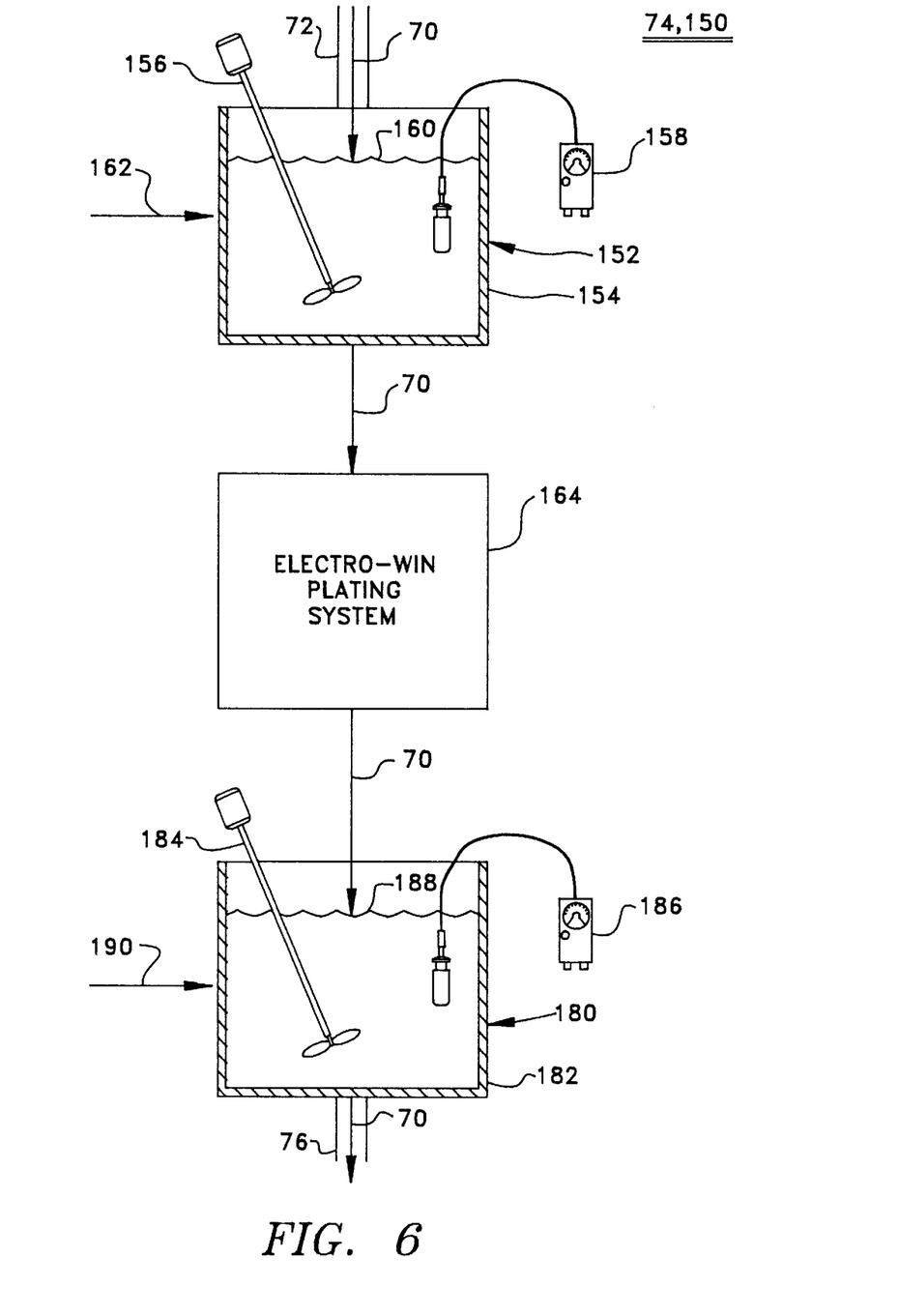
FIG. 6 is a schematic view of an electro-win plating means used in a catholyte processing means of the invention.

Now referring to FIG. 6, the catholyte fluid processing means 74 is an electro-win plating means 150. In the electro-win plating means 150, the catholyte fluid stream 70 is removed from the catholyte vessel 16 by a catholyte vessel exit means 72 and delivers it into catholyte pH adjustment means 152. The catholyte pH adjustment means 152 comprises an agitator 156 and a pH meter 158 disposed in a pH adjustment vessel 154. The catholyte fluid stream 70 is delivered to a catholyte fluid 160 in vessel 154 where is it is agitated by agitator 156 and its pH is measured by pH meter 158. The pH of the catholyte fluid 160 is adjusted upwards by the addition of a base 162 until the required pH is reached for the fluid to be treated by an electro-win plating system 164 described below, which is typically approximately 4 pH to 5 pH. The base 162 can be added manually or with a programmable controller (not shown) based upon the pH of catholyte fluid 160. The base 162 is typically less than 2 molar in concentration with the type of base chosen being dependent upon the circumstances. As with the other pH adjustment means, the catholyte pH adjustment means 152 can be any suitable pH adjustment means, including an in-line pH adjustment system. The catholyte fluid stream 70 is withdrawn from the catholyte fluid 160 and delivered to electro-win plating system 164.

Electro-win plating systems suitable in the practice of the present invention are fully disclosed in U.S. Pat. No. 5,156, 722 to Snyder et al. entitled "Decontamination of Radioactive Metals" (the 722 patent); U.S. Pat. No. 5,217,585 to Snyder et al. entitled "Transition Metal Decontamination Process" (the 585 patent); and U.S. Pat. No. 5,262,019 to Snyder et al. entitled "Decontamination of Radioactive Metals" (the 019 patent), all of which are incorporated by reference herein in their entireties. The electro-win plating system 164 of the present invention is not limited to those disclosed in the 722, 585, or 019 patents and may be any other suitable electro-win plating system. Other embodiments of the invention may use an electro-refining system to remove the contaminants from stream 70 in place of electro-win plating system 164. Suitable electro-refining systems are disclosed in the 722 patent; U.S. Pat. No. 5,183,541 to Snyder et al. entitled "Decontamination of Radioactive Metals" (the 541 patent); and U.S. Pat. No. 5,439,562 to Snyder et al. entitled "Electrochemical Decontamination of Radioactive Metals by Alkaline Processing" (the 562 patent), all of which are incorporated by reference herein in their entireties. The electro-refining system of the present invention is not limited to those disclosed in the 722, 541, or 562 patents and may be any other suitable electro-refining system.

The electro-win plating system accepts catholyte fluid stream 70 from the catholyte pH adjustment means 152, removes at least a portion of the contaminants therefrom, and discharges the stream to a catholyte pH adjustment means 180. The catholyte pH adjustment means 180 is comprised of an agitator 184 and a pH meter 186 disposed in a pH adjustment vessel 182. The catholyte fluid stream 70 is delivered to a catholyte fluid 188 in the pH adjustment vessel 182, where it is agitated by agitator 184 and its pH is measured by pH meter 186. The pH of the catholyte fluid 188 is adjusted downward with acid 190 until the pH is approximately 1–4. Acid 190 is concentrated acid to minimize volumetric changes and the type of acid is dependent upon the specific circumstances. As with the other pH adjustment means, the catholyte pH adjustment means 180 can be any suitable type of pH adjustment device, including an in-line pH adjustment device.

The catholyte fluid stream 70 is removed from the catholyte fluid 188 and returned to catholyte vessel 16 via catholyte fluid return means 76. It is understood that the movement of catholyte stream 70 through catholyte fluid return means 76 is accomplished with the necessary equipment, including a simple pipe, a pumping system controlled by a programmable controller or any other suitable means.

Figure 7:
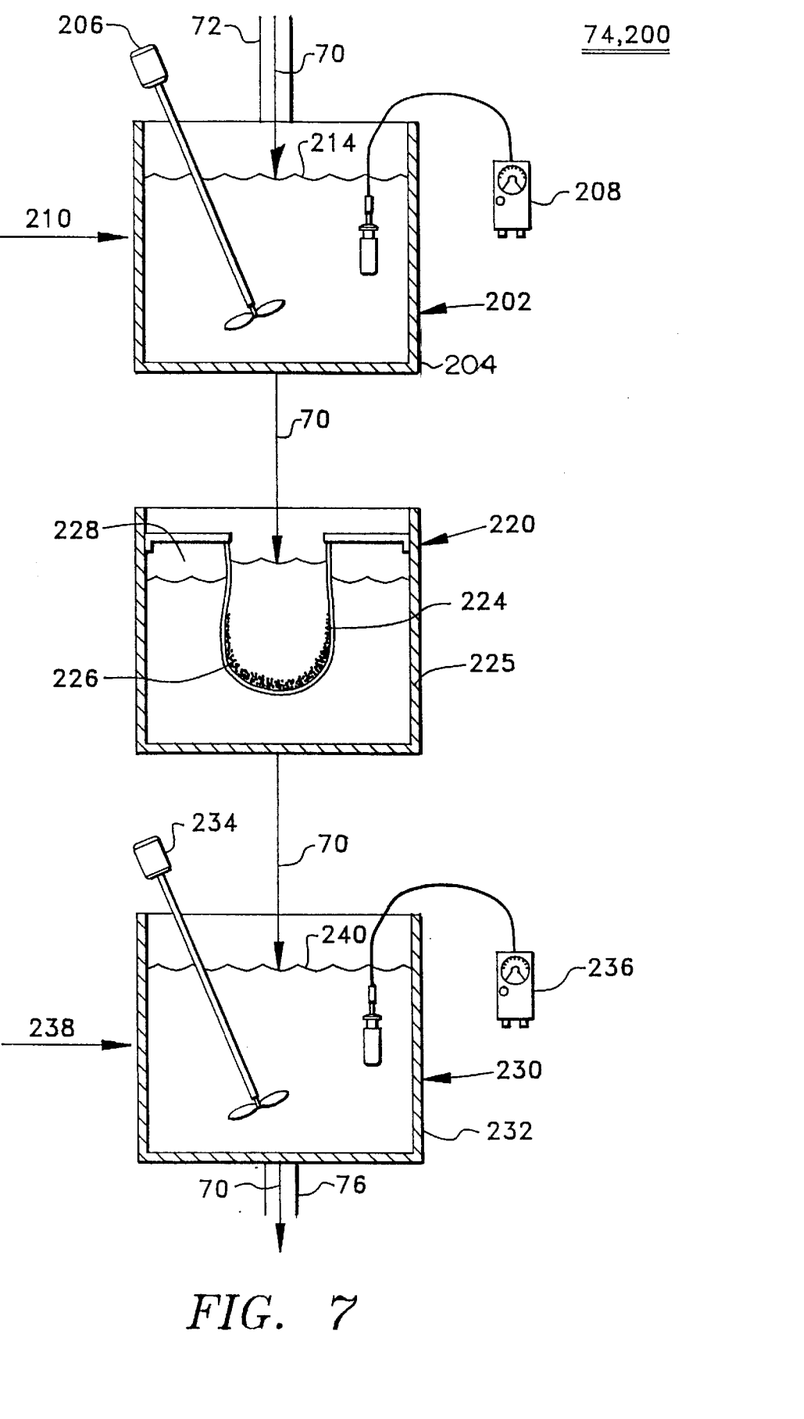
FIG. 7 is a schematic view of a hydroxide compound filtering process used in a catholyte processing means of the invention.

Now referring to FIG. 7, it is shown that catholyte processing means 74 may also be a hydroxide compound filtering process 200. The catholyte fluid exit means 72 removes the catholyte fluid stream 70 from catholyte vessel 16 and delivers it into a catholyte pH adjustment means 202.

The catholyte pH adjustment means 202 is comprised of an agitator 206 and a pH meter 208 disposed in a pH adjustment vessel 204. The catholyte fluid stream 70 is delivered to a catholyte fluid 214 in the pH adjustment vessel 204, where it is agitated by agitator 206 and its pH is measured by the pH meter 208. $NH_4OH$ 210 is introduced into the catholyte fluid 214 to neutralize it and form hydroxide compounds with the cationic contaminants. The introduction of the $NH_4OH$ 210 can either be controlled by a programmable controller connected to pH meter 208, performed manually, or any other suitable means. In other embodiments of the invention, the catholyte pH adjustment means 202 can be any suitable means to introduce the $NH_4OH$ 210 into the catholyte fluid 214, including an in-line pH adjustment apparatus (not shown). Additionally, $NH_3$ can be substituted for $NH_4OH$ 210.

The catholyte fluid stream 70 with hydroxide compounds flows from the catholyte pH adjustment means 202 into filter means 220, where the hydroxide compounds are filtered out. The filter means 220 is a bag filter system consisting of a bag filter 224 suspended in a housing 225. In the preferred embodiment, the bag filter is between 10 $\mu$ to 50 $\mu$. The catholyte fluid stream 70 with ammonium compounds enters the filter means 220 and flows from the inside to the outside of the bag filter 224. As it flows through the bag filter 224, hydroxide compound deposits 226 are formed from the hydroxide compounds being deposited on the inside of the bag filter. Other embodiments of the invention include any other suitable filtering media, including other bag filter arrangements, filter plates, filter beds, and filter cartridges. After passing through the bag filter 224, the catholyte fluid 70 collects in the housing 225 as an catholyte fluid 228.

The catholyte fluid stream 70 is withdrawn from catholyte fluid 228 and delivered to a catholyte pH adjustment means 230. The catholyte pH adjustment means 230 is comprised of an agitator 234 and a pH meter 236 disposed in a pH adjustment vessel 232. The catholyte fluid stream 60 is delivered to an catholyte fluid 240 in the pH adjustment vessel 232, where it is agitated by agitator 234 and its pH measured by the pH meter 236. The catholyte pH adjustment means 230 lowers the pH of the catholyte fluid 240 to approximately 1–4 pH. This is accomplished by adding concentrated acid 238 to the catholyte fluid 240. The strength and type of acid is a function of the specific circumstances. As with the catholyte pH adjustment means 202, the catholyte pH adjustment means 230 can be any suitable method for lowering the pH of catholyte fluid 240 including an in-line pH adjustment device. Although not represented in FIG. 7, it should be understood that any required piping, pumping, and control means necessary to move catholyte fluid stream 70 through the different stages of hydroxide filtering process 200 is included in the invention.

The catholyte fluid stream 70 is removed from the pH adjustment vessel 232 and returned to the catholyte vessel 16 via an catholyte return means 76.

In an additional embodiment of the invention, the catholyte fluid processing means 74 is a resin bed (not shown) which adsorbs the cationic contaminants in the catholyte fluid stream 70. The resin bed may either be fixed or fluid. The resin may be any suitable resin for adsorbing the contaminants present in the catholyte fluid stream 70. After the fluid stream 70 passes through the resin bed, it returns to the catholyte vessel 16 via catholyte fluid return means 76.

EXAMPLE 1

Fines 24 are contaminated with 1000 ppm of cobalt, lead, and copper combined and 1000 ppm of uranium. The lixiviant 28 is 3 molar $H_2SO_4$. The fines 24 and lixiviant 28 are directed into waste vessel 12 where they combine to make the fines and lixiviant mixture 36 having a pH of 5. The anode 42, cathode 44 and power source 40 are such that the electrochemical leaching system has 10 has a current density of 30 amps/ft$^2$ electrode and a potential of 3 volts. The catholyte fluid processing means 74 is a resin bed system comprising resin which is commercially offered by Resintech, Inc., 615 Deer Road, Cherry Hill, N.J. 08034 as SIR-200 resin. Other embodiments of the invention may use other suitable resins. The flow across the resin bed is 2 gallons per minute/ft$^2$ of bed cross section.

EXAMPLE 2

The same as Example 1, but the fines are contaminated are contaminated with 1000 ppm cesium and the resin is commercially offered by Resintech, Inc., 615 Deer Road, Cherry Hill, N.J. 08034 as SIR-600 Zeolite resin. Other embodiments of the invention may use other suitable resins.

EXAMPLE 3

Fines 24 are contaminated with 1000 ppm of cobalt, lead, and copper combined and 1000 ppm of uranium. The lixiviant 28 is 1 molar $H_2SO_4$. The fines 24 and lixiviant 28 are directed into waste vessel 12 where they combine to make the fines and lixiviant mixture 36 having a pH of 4. The anode 42, cathode 44 and power source 40 are such that the electrochemical leaching system has 10 has a current density of 0.1 amps/ft$^2$ electrode. The catholyte fluid processing means 74 is a resin bed system comprising resin which is commercially offered by Resintech, Inc., 615 Deer Road, Cherry Hill, N.J. 08034 as SIR-300 resin. Other embodiments of the invention may use other suitable resins. The flow across the resin bed is 0.1 gallons per minute/ft$^2$ of bed cross section.

The present invention removes anionic and cationic contaminates from contaminated fines. The present invention may be practiced in a batch, a semi-continuous batch, or a continuous manner. Accordingly, the present invention may be embodied in other specific forms without departing from the spirit or essential attributes thereof and, accordingly, reference should be made to the appended claims, rather than to the foregoing specification, as indicating the scope of the invention.

We claim:

1. An electrochemical leaching system comprising:

a waste vessel for receiving and holding a lixiviant and fines comprising contaminants being ionizable to anionic contaminants and cationic contaminants;

delivery means for delivering the lixiviant and the fines to the waste vessel;

an anolyte vessel for holding an anolyte fluid;

anolyte barrier means disposed between and adjacent to the anolyte vessel and the waste vessel for allowing the anionic contaminants to flow between the waste vessel and the anolyte vessel and for inhibiting bulk transfer of the anolyte fluid, the lixiviant, and the fines between the waste vessel and the anolyte vessel;

anolyte processing means operatively associated with the anolyte vessel for removing anionic contaminants from the anolyte fluid;

an anode located in the anolyte fluid;

a catholyte vessel for holding a catholyte fluid;

catholyte barrier means disposed between and adjacent to the catholyte vessel and the waste vessel for allowing the cationic contaminants to flow between the waste vessel and the catholyte vessel and for inhibiting bulk transfer of the catholyte fluid, the lixiviant, and the fines between the waste vessel and the catholyte vessel;

catholyte processing means operatively associated with the catholyte vessel for removing cationic contaminants from the catholyte fluid;

a cathode located in the catholyte fluid;

voltage generation means connected to the anode and the cathode for applying an electrical potential therebetween; and removal means for removing the lixiviant and the fines from the waste vessel.

2. The system of claim 1, wherein the waste vessel, the anolyte vessel, and the catholyte vessel are disposed within a unitary vessel, the waste vessel being disposed between the anolyte vessel and the catholyte vessel.

3. The system of claim 1, wherein:

the anolyte barrier means is a semi-permeable first barrier; and the catholyte barrier means is a semi-permeable second barrier.

4. The system of claim 3, wherein the semi-permeable first barrier is an anionic membrane and the semi-permeable second barrier is a cationic membrane.

5. The system of claim 3, wherein the semi-permeable first barrier comprises:

a semi-permeable first membrane;

a weak-base, powdered resin anion exchanger disposed on the first membrane; and a semi-permeable second membrane disposed on the anion exchanger.

6. The system of claim 3, wherein the semi-permeable second barrier comprises:

a semi-permeable first membrane;

a weak-acid, powdered resin cation exchanger disposed on the first membrane; and a semi-permeable second membrane disposed on the cation exchanger.

7. The system of claim 1, wherein the anolyte processing means comprises:

anolyte fluid exit means for flowing an anolyte fluid stream from the anolyte vessel;

first anolyte pH adjustment means operatively connected to the anolyte exit means for receiving the anolyte fluid stream, for mixing $NH_3$ or $NH_4OH$ therewith, for creating ammonium compounds with at least a portion of the anionic contaminants, and for releasing the anolyte fluid stream;

filter means operatively connected to the first anolyte pH adjustment means for receiving the anolyte fluid stream, for filtering out at least a portion of the ammonium compounds therefrom, and for releasing the anolyte fluid stream;

second anolyte pH adjustment means operatively connected to the filter means for receiving the anolyte fluid stream, for adjusting the pH thereof to approximately between 6 and 8 pH, and for releasing the anolyte fluid stream; and anolyte fluid return means operatively connected to the second anolyte pH adjustment means and the anolyte fluid vessel for receiving the anolyte fluid stream and for delivering same to the anolyte fluid vessel.

8. The system of claim 1, wherein the catholyte processing means comprises:

catholyte fluid exit means for flowing an catholyte fluid stream from the catholyte vessel;

first catholyte pH adjustment means operatively connected to the catholyte exit means for receiving the catholyte fluid stream, for adjusting the pH thereof to within a range suitable for electro-win plating the catholyte fluid stream, and for releasing the catholyte fluid stream;

electro-win plating system operatively connected to the first catholyte pH adjustment means for receiving the catholyte fluid stream, for removing at least a portion of the cationic contaminants therefrom, and for releasing the catholyte fluid stream;

second catholyte pH adjustment means operatively connected to the electro-win plating means for receiving the catholyte fluid stream, for adjusting the pH thereof to approximately 1–4, and for releasing the catholyte fluid stream; and catholyte fluid return means operatively connected to the second catholyte pH adjustment means and the catholyte fluid vessel for receiving the catholyte fluid stream and for delivering same to the catholyte fluid vessel.

9. The system of claim 1, wherein the catholyte processing means comprises:

catholyte fluid exit means for flowing an catholyte fluid stream from the catholyte vessel;

third catholyte pH adjustment means operatively connected to the catholyte exit means for receiving the catholyte fluid stream, for adjusting the pH thereof to within a range suitable for electro-refining the catholyte fluid stream, and for releasing the catholyte fluid stream;

electro-refining system operatively connected to the third catholyte pH adjustment means for receiving the catholyte fluid stream, for removing at least a portion of the cationic contaminants therefrom, and for releasing the catholyte fluid stream;

fourth catholyte pH adjustment means operatively connected to the electro-win plating means for receiving the catholyte fluid stream, for adjusting the pH thereof to approximately 1–4, and for releasing the catholyte fluid stream; and catholyte fluid return means operatively connected to the fourth catholyte pH adjustment means and the catholyte fluid vessel for receiving the catholyte fluid stream and for delivering same to the catholyte fluid vessel.

10. The system of claim 1, wherein the catholyte processing means comprises:

catholyte fluid exit means for flowing an catholyte fluid stream from the catholyte vessel;

fifth catholyte pH adjustment means operatively connected to the catholyte exit means for receiving the catholyte fluid stream, for adjusting the pH thereof with concentrated $NH_4OH$ or $NH_3$, for creating hydroxide compounds with at least a portion of the cationic contaminants, and for releasing the catholyte fluid stream;

filter means operatively connected to the fifth catholyte pH adjustment means for receiving the catholyte fluid stream, for filtering out the hydroxide compounds from the catholyte fluid stream, and for releasing the catholyte fluid stream;

sixth catholyte pH adjustment means operatively connected to the filtering means for receiving the catholyte fluid stream, for adjusting the pH thereof to approximately 1–4, and for releasing the catholyte fluid stream; and catholyte fluid return means operatively connected to the sixth catholyte pH adjustment means and the catholyte fluid vessel for receiving the catholyte fluid stream and for delivering same to the catholyte fluid vessel.

11. The system of claim 10, wherein the filter means uses approximately $10\,\mu$ to $50\,\mu$ filtering media.

12. The system of claim 1, wherein the catholyte processing means comprises:

catholyte fluid exit means for flowing the catholyte fluid stream from the catholyte vessel;

a resin bed with resin for adsorbing the cationic contaminants, operatively connected to the catholyte fluid exit means;

catholyte fluid return means operatively connected to the resin bed for receiving the catholyte fluid stream and for delivering same to the catholyte fluid vessel.

13. The system of claim 1, wherein the waste vessel is a batch reactor, a semi-continuous batch reactor, or a continuous batch reactor.

14. A method for removing contaminants from fines in a lixiviant, comprising the steps of:

disposing the fines and the lixiviant between an anolyte fluid and a catholyte fluid, the anolyte fluid disposed about an anode and the catholyte fluid disposed about a cathode, the lixiviant in electrical connection with the anolyte fluid and the catholyte fluid;

inhibiting migration of the fines and the lixiviant into the anolyte fluid and the catholyte fluid, and migration of the anolyte fluid and the catholyte fluid into the lixiviant;

applying an electrical potential between the anode and the cathode, thereby liberating the contaminants from the fines by transforming the contaminants into anionic contaminants and cationic contaminants in the lixiviant;

enabling the anionic contaminants to migrate into the anolyte fluid and the cationic contaminants to migrate into the catholyte fluid;

processing the anolyte fluid to remove the anionic contaminants;

processing the catholyte fluid to remove the cationic contaminants; and removing the fines and the lixiviant from between the anolyte fluid and the catholyte fluid.

15. The method of claim 14, wherein the inhibiting step further comprises:

disposing a semi-permeable first barrier between the lixiviant and the anolyte solution; and disposing a semi-permeable second barrier between the lixiviant and the catholyte solution.

16. The method of claim 15, wherein the semi-permeable first barrier is an anionic membrane and the semi-permeable second barrier is a cationic membrane.

17. The method of claim 14, wherein the inhibiting step further comprises:

applying a weak-base, powdered resin, anion exchanger to a surface of a semi-permeable first membrane;

applying a semi-permeable second membrane to the anion exchanger, creating a membrane/anion exchanger/membrane barrier; and disposing the membrane/anion exchanger/membrane barrier between the lixiviant and the anolyte fluid.

18. The method of claim 14, wherein the inhibiting step further comprises:

applying a weak-acid, powdered resin, cation exchanger to a surface of a semi-permeable first membrane;

applying a semi-permeable second membrane to the cation exchanger, creating a membrane/cation exchanger/membrane barrier; and disposing the membrane/cation exchanger/membrane barrier between the lixiviant and the catholyte fluid.

19. The method of claim 14, wherein the processing the anolyte fluid step comprises the steps of:

removing an anolyte fluid stream from the anolyte fluid;

mixing $NH_3$ or $NH_4OH$ into the anolyte fluid stream, thereby creating ammonium compounds with at least a portion of the anion contaminants;

filtering out at least a portion of the ammonium compounds from the anolyte stream; and delivering anolyte fluid stream to the anolyte fluid.

20. The method of claim 14, wherein the processing the catholyte fluid step comprises the steps of:

removing a catholyte fluid stream from the catholyte fluid;

using an electro-win plating system to remove at least a portion of the cationic contaminants from the catholyte fluid stream; and returning the catholyte fluid stream to the catholyte fluid.

21. The method of claim 14, wherein the processing the catholyte fluid step comprises the steps of:

removing a catholyte fluid stream from the catholyte fluid;

using an electro-refining system to remove at least a portion of the cationic contaminants from the catholyte fluid stream; and returning the catholyte fluid stream to the catholyte fluid.

22. The method of claim 14, wherein the processing the catholyte fluid step comprises the steps of:

removing a catholyte fluid stream from the catholyte fluid;

mixing $NH_4OH$ into the catholyte fluid, thereby creating hydroxide compounds with at least a portion of the cationic contaminants;

filtering out the hydroxide compounds from the catholyte fluid stream; and delivering the catholyte fluid stream to the catholyte fluid.

23. The method of claim 22, wherein the filtering step filters the catholyte fluid stream through approximately $10\,\mu$ to $50\,\mu$ filtering media.

24. The method of claim 14, wherein the processing the catholyte fluid step comprises the steps of:

removing a catholyte fluid stream from the catholyte fluid;

absorbing the cationic contaminants in the catholyte fluid stream on resin in a resin bed; and delivering the catholyte fluid stream to the catholyte fluid.

25. The method of claim 14, further comprising the step of coordinating the disposing step and the removing step such that the fines and the lixiviant travel between the anolyte fluid and the catholyte fluid in either a batch, semi-continuous, or a continuous manner.

* * * * *